Figure 1:
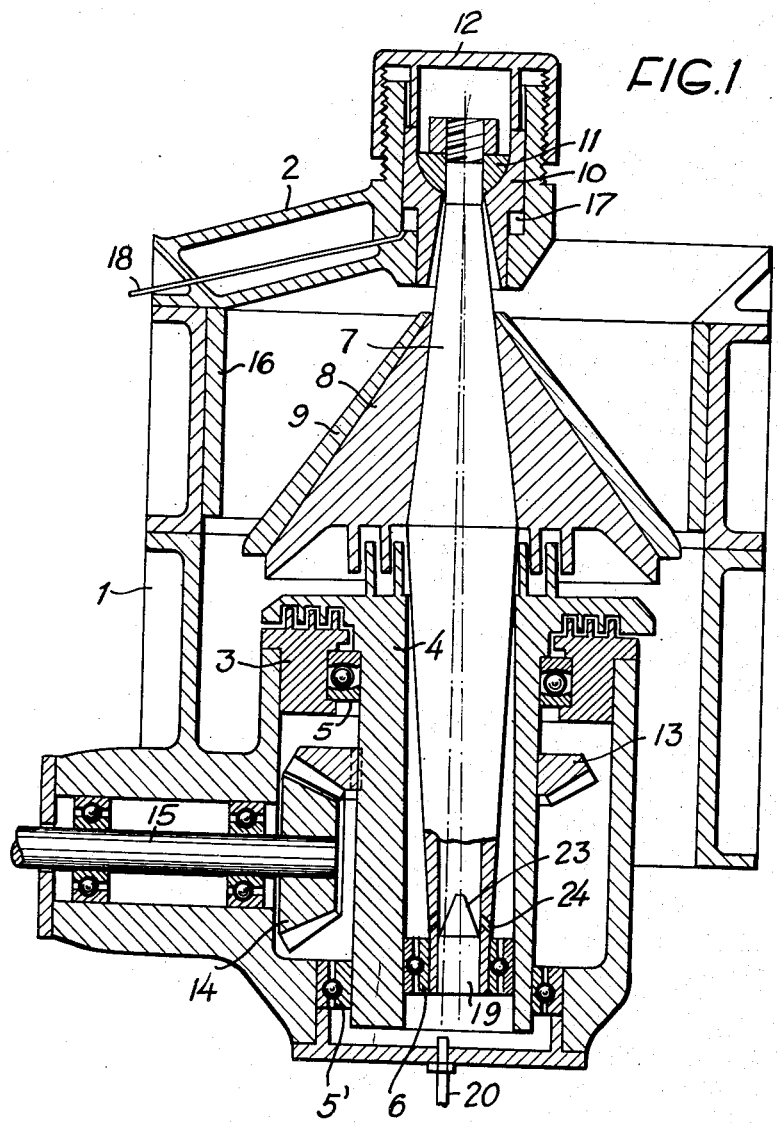

June 21, 1955

J. S. BROMAN 2,711,355

BEARING LUBRICATION

Filed April 23, 1953

2 Sheets-Sheet 1

INVENTOR.
John Samuel Broman
BY
Pierce, Scheffler & Parker
atty's

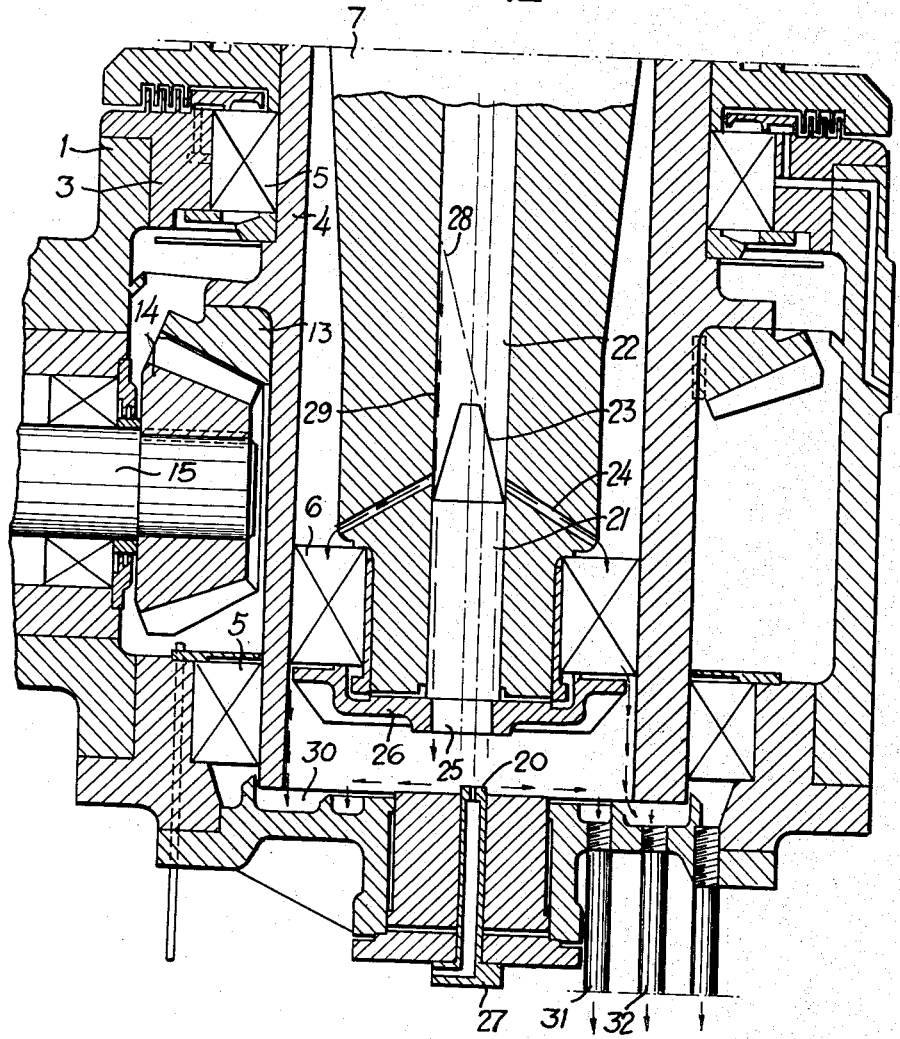

United States Patent Office 2,711,355
Patented June 21, 1955

2,711,355

BEARING LUBRICATION

John Samuel Broman, Smedjebacken, Sweden, assignor to Morgardshammars Mek. Verkstads Aktiebolag, Morgardshammar, Sweden, a corporation of Sweden Application April 23, 1953, Serial No. 350,564

Claims priority, application Sweden April 26, 1952

4 Claims. (Cl. 308—134.1)

The present invention relates to means for lubricating bearings movable in one or more planes and requiring a periodical or continuous supply of lubricant. Such is the case in gyratory crushers where the shaft of the crusher will have the movement imparted thereto by means of an eccentric enclosing the lower part of the shaft, said eccentric being guided by bearings fixed in the frame of the crusher, and by means of an eccentrically disposed bore for the mounting of the shaft of the crusher. In certain types of gyratory crusher, the shaft with the bearing is also movable axially to prevent excessive load on the crusher head.

The object of the present invention is to provide a simple and reliable lubrication contrivance for movable bearings particularly bearings designed for gyratory movement and also being displaceable axially.

The invention may comprise a stationary nozzle for the generation of a jet of lubricant, a collecting space for lubricant in a shaft carrying the bearing, as well as one or more passages for the lubricant leading from said space to the bearing, the nozzle being then directed so that the lubricant from the jet will be collected at the collecting space to be conveyed to the bearing. In applying the invention to gyratory crushers, the ejector nozzle may be disposed most simply in the frame underneath the lower end of the crusher shaft so as to become directed upwardly toward the shaft. A deflecting screen or the like may be arranged in the path of the jet, so that the latter will be deflected in a direction such as to facilitate the collection of the lubricant. An advantageous and simple construction of this kind may be attained by providing the shaft end carrying the bearing with a bore and by arranging therein a deflecting member in the form of a funnel turned upside down, said funnel being struck upon by the jet, which latter is thus deflected toward the wall of the bore above the funnel. The collecting place may then be formed by the space between the upwardly tapering portion of the funnel and the wall of the bore, and the lower part of said space may communicate with the bearing through channels extending from the bore, preferably obliquely downwards and out through the shaft.

With the use of rolling bearings for the crusher shaft, it is of importance that the quantity of lubricant flowing through the bearing be kept constant and readily controllable. Through the invention this requirement can also be satisfied, inasmuch as the waste from the jet can be normally kept at a value so low as to become negligible in comparison with the oil quantity supplied.

The accompanying drawings illustrate an example of the application of the invention to a gyratory crusher with the crusher shaft arranged both for a gyrating movement and for a movement of displacement in the axial direction. Fig. 1 shows the entire crusher in axial section. Fig. 2 shows the lower part of the crusher in the same manner and to a larger scale with the contrivance according to the invention for the supply of the lubricant to the lower bearing of the crusher shaft.

In the drawing, 1 designates the frame of the crusher, 2 a top bearing housing secured at the top of the frame, and 3 a bearing housing for the upper bearing 5 of an eccentric sleeve 4 in the frame. The lower bearing of the eccentric sleeve is denoted by 5'. The crusher shaft 7 is mounted in the eccentric sleeve 4 by means of a lower bearing 6, while the upper end of the crusher shaft is suspended in a spherical bearing body 11 resting in a corresponding seat on a bearing body 10 formed as a plunger within a cylinder 17 in the top bearing housing 2. 8 designates the crusher cone rigidly secured onto the crusher shaft, and 9 denotes the inner crusher mantle secured thereon. 16 is the stationary crusher shell arranged in the crusher frame 1. The bearing body 10 is kept raised against a controllable stop 12, arranged as a cover in the bearing housing 2, by the pressure of oil introduced through a conduit 18 into the cylinder 17, whereas said bearing body is pressed downwardly, if the working pressure on the crusher cone exceeds a predetermined value. The crusher is driven from a driving shaft 15 over a bevel gearing 13, 14 acting upon the eccentric sleeve 4.

When the eccentric sleeve 4 rotates, the lower end of the crusher shaft, which is eccentrically mounted in the sleeve, will perform a gyrating movement. Furthermore, it is able to move downward, that is to say, when the predetermined pressure prevailing in the cylinder 17 is exceeded and it will be elevated again after the load on the crusher head has been reduced. The bearing 6 is entrained in this movement up and down, and for this reason the supply of lubricant to this bearing meets with difficulties. According to the invention, these difficulties have been obviated by the fact that the crusher shaft is provided with an axial bore 19 in the lower end thereof, while an ejector nozzle 20 has been provided in a suitable position underneath the end of the shaft, said nozzle being secured in the frame and directed upwardly toward the bore of the shaft, so that a jet coming from the nozzle will be injected into the bore. The bore is provided therein with a deflecting screen in the form of a funnel 23, which may form the end of a tube 21 fitted into the bore and retained in its place by means of a bearing shield 26 provided with a central opening 25, said bearing shield being removably secured to the end of the shaft. A collecting place 22 for the lubricant is formed between the funnel 23, which is turned upside down and preferably of a conical configuration, and the wall of the bore, channels 24 extending from said collecting place obliquely downwardly toward the upper side of the bearing 6. A number of channels 24 may be provided, the same being preferably distributed uniformly round the circumference, so that the lubricant will be distributed to the various points of the bearing in a suitable manner.

The oil jet from the nozzle 20, which may be connected through a pipe socket 27 and a suitable conduit to a suitable circulation conduit for oil under pressure, is directed so as to always strike upon the funnel 23 in every position of the end of the shaft, and is thus deflected toward the wall of the bore 19, as shown by the dashed line 28, in order then to flow down the bore to the collecting place 22, as shown by the arrows 29. From the collecting place, the oil is distributed in the manner set forth to the bearing, for which good lubrication in a suitable quantity is thus always ensured.

The oil flowing down from the bearing 6 may pass outside the circumference of the bearing shield 26, and may be collected in an oil sump 30 provided with a draining pipe 32, through which it may be returned to the oil circulating system.

The invention is not restricted to the type of crushers shown in Fig. 1, but is applicable to arbitrary gyratory crushers, consequently also to such that have the crusher shaft mounted only below the crusher head.

What I claim is:

1. In a machine having a gyratory shaft and a bearing on said shaft; a contrivance for lubricating said bearing comprising a stationary nozzle for generating a jet of lubricant, collecting means forming a collecting space for lubricant, said nozzle being directed toward said collecting space and the shaft having passages extending from the collecting space to convey the lubricant therefrom to the bearing.

2. In a machine having a gyratory shaft and a bearing on said shaft; a contrivance for lubricating said bearing comprising a stationary nozzle for generating a jet of lubricant, and a deflecting member in the path of the jet to divert the jet to a place at the surface of the shaft, said deflecting member forming a collecting space for lubricant below said place and the shaft having one or more passages extending from the collecting space to convey the lubricant therefrom to the bearing.

3. In a machine having an upright gyratory shaft with an axial bore, and a bearing on said shaft; means for lubricating said bearing comprising a stationary nozzle for generating a jet of lubricant, collecting means in the form of a funnel turned upside down and mounted in said axial bore in the path of the jet to form a collecting space for lubricant between the upwardly tapering part of the funnel and the wall of the bore, the shaft having a passage for conveying lubricant from said collecting space to the bearing.

4. In a gyratory crusher having its upright axially bored gyratory shaft mounted in a bearing attached eccentrically in a rotary bored sleeve, a contrivance for lubricating said bearing comprising a stationary nozzle for directing a jet of lubricant into the bore of the shaft, collecting means in the form of a funnel turned upside down and mounted in said axial bore in the path of the jet to form a collecting space for lubricant between the upwardly tapering part of the funnel and the wall of the bore, the shaft having a passage for lubricant, said passage extending from said collecting space to the bore of the sleeve opening thereinto at a point above the bearing.

References Cited in the file of this patent

UNITED STATES PATENTS 2,039,469    Williams _____ May 5, 1936